(12) United States Patent
Polaganga et al.

(10) Patent No.: US 12,052,626 B2
(45) Date of Patent: Jul. 30, 2024

(54) STEERING NON-MOBILE CONNECTED-MODE USER EQUIPMENT TO HIGHER CAPACITY RADIO CELLS

(71) Applicant: T-Mobile USA, Inc., Bellevue, WA (US)

(72) Inventors: Roopesh Kumar Polaganga, Bellevue, WA (US); Deepak Nadh Tammana, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 397 days.

(21) Appl. No.: 17/560,773

(22) Filed: Dec. 23, 2021

(65) Prior Publication Data

US 2023/0209432 A1  Jun. 29, 2023

(51) Int. Cl.
*H04W 36/30* (2009.01)
*H04W 24/04* (2009.01)

(52) U.S. Cl.
CPC ........... *H04W 36/30* (2013.01); *H04W 24/04* (2013.01)

(58) Field of Classification Search
CPC .... H04W 36/30; H04W 24/04; H04W 36/304
See application file for complete search history.

(56) References Cited

U.S. PATENT DOCUMENTS

| 7,003,297 | B2 | 2/2006 | Willars et al. |
| 7,072,656 | B2 | 7/2006 | Willars et al. |
| 7,796,991 | B2 | 9/2010 | Pirskanen |
| 8,359,034 | B2 | 1/2013 | Ishii |
| 8,565,188 | B2 | 10/2013 | Lin et al. |
| 8,639,250 | B2 | 1/2014 | Pirskanen |
| 8,842,546 | B2 | 9/2014 | Chen et al. |
| 8,958,799 | B2 | 2/2015 | Vangala et al. |
| 9,042,895 | B2 | 5/2015 | Centonza et al. |
| 9,113,385 | B2 | 8/2015 | Pettersson et al. |
| 9,143,995 | B2 | 9/2015 | Okmyanskiy et al. |
| 9,277,473 | B2 | 3/2016 | Sarkar et al. |
| 9,307,454 | B2 | 4/2016 | Edge |
| 9,392,542 | B2 | 7/2016 | Ingale et al. |
| 9,445,339 | B2 | 9/2016 | Axmon et al. |
| 9,510,253 | B2 | 11/2016 | Han et al. |
| 9,706,451 | B2 | 7/2017 | Mohan et al. |
| 9,775,048 | B2 | 9/2017 | Reddy et al. |

(Continued)

FOREIGN PATENT DOCUMENTS

| CN | 1230033 A | 9/1999 |
| CN | 102083161 A | 6/2011 |

(Continued)

*Primary Examiner* — Jae Y Lee
(74) *Attorney, Agent, or Firm* — Perkins Coie LLP (57) ABSTRACT

The disclosed technology provides system and methods for steering wireless communication devices away from low capacity layers (e.g., cells operating on low bandwidth frequency bands or low capacity radio access technologies (RATs) when the devices are stuck on such low capacity layers because of operational state changes of radio cells that the devices can attach to. For example, when a base station determines that a stationary, connected-mode, device has been operating on a low capacity layer for a certain duration, or if a higher capacity layer that was previously out of service comes back in service, the base station can initiate a handover causing the device to attach to the higher capacity layer.

20 Claims, 6 Drawing Sheets

(56) References Cited

U.S. PATENT DOCUMENTS

| | | |
|---|---|---|
| 9,807,652 B2 | 10/2017 | Grech et al. |
| 9,848,340 B2 | 12/2017 | Kazmi et al. |
| 10,028,129 B2 | 7/2018 | Ly et al. |
| 10,271,252 B2 | 4/2019 | Jung et al. |
| 10,285,106 B2 | 5/2019 | Han et al. |
| 10,306,636 B2 | 5/2019 | Liu |
| 10,349,324 B2 | 7/2019 | Tsai |
| 10,448,296 B2 | 10/2019 | Radulescu et al. |
| 10,470,118 B2 | 11/2019 | Horn et al. |
| 10,681,768 B2 | 6/2020 | Chang et al. |
| 10,772,023 B2 | 9/2020 | Kapoulas et al. |
| 10,834,654 B2 | 11/2020 | Vivanco |
| 10,887,813 B2 | 1/2021 | Wang et al. |
| 10,979,944 B2 | 4/2021 | Yiu |
| 11,032,783 B2 | 6/2021 | Kubota et al. |
| 11,057,814 B2 | 7/2021 | Zhang et al. |
| 11,122,478 B2 | 9/2021 | Zhu et al. |
| 2007/0149206 A1 | 6/2007 | Wang et al. |
| 2009/0052398 A1 | 2/2009 | Hofmann |
| 2010/0227614 A1 | 9/2010 | Chun et al. |
| 2012/0264433 A1 | 10/2012 | Whinnett et al. |
| 2014/0045502 A1 | 2/2014 | Whinnett et al. |
| 2014/0051443 A1 | 2/2014 | Diachina et al. |
| 2014/0051445 A1 | 2/2014 | Vikberg et al. |
| 2014/0192771 A1 | 7/2014 | Jung et al. |
| 2015/0163732 A1 | 6/2015 | Chisu et al. |
| 2015/0223127 A1 | 8/2015 | Godin et al. |
| 2015/0312813 A1 | 10/2015 | Xu et al. |
| 2016/0007319 A1 | 1/2016 | He et al. |
| 2016/0337928 A1 | 11/2016 | Yang et al. |
| 2016/0366619 A1 | 12/2016 | Yang et al. |
| 2017/0019819 A1 | 1/2017 | Yang et al. |
| 2018/0152865 A1 | 5/2018 | Atri et al. |
| 2019/0261429 A1 | 8/2019 | Hu et al. |
| 2019/0387438 A1* | 12/2019 | Chang .................. H04W 76/27 |
| 2019/0387561 A1 | 12/2019 | Paladugu et al. |
| 2020/0053602 A1 | 2/2020 | Kadiri et al. |
| 2020/0120552 A1 | 4/2020 | Yang et al. |
| 2020/0221469 A1 | 7/2020 | Lee et al. |
| 2020/0252844 A1 | 8/2020 | Ahmavaara |
| 2020/0322856 A1* | 10/2020 | Wang .................. H04W 76/10 |
| 2021/0044993 A1 | 2/2021 | Jha et al. |
| 2021/0068182 A1 | 3/2021 | He et al. |
| 2021/0105674 A1 | 4/2021 | Kim et al. |
| 2021/0112616 A1 | 4/2021 | Karandikar et al. |
| 2021/0160942 A1 | 5/2021 | Venkatachari et al. |
| 2021/0195513 A1 | 6/2021 | Zhang et al. |
| 2021/0211953 A1 | 7/2021 | Tsai |
| 2021/0219194 A1 | 7/2021 | Zhang et al. |
| 2021/0235371 A1 | 7/2021 | Won |
| 2022/0400528 A1* | 12/2022 | Ravuvari ............... H04W 36/08 |
| 2023/0239767 A1* | 7/2023 | Chen ..................... H04W 48/20 370/329 |

FOREIGN PATENT DOCUMENTS

| | | |
|---|---|---|
| CN | 102238655 A | 11/2011 |
| CN | 103856998 A | 6/2014 |
| CN | 104137608 A | 11/2014 |
| CN | 104159261 A | 11/2014 |
| CN | 105474724 A | 4/2016 |
| CN | 103314618 B | 5/2016 |
| CN | 105592494 A | 5/2016 |
| CN | 103120003 B | 9/2016 |
| CN | 107211469 A | 9/2017 |
| CN | 107211473 A | 9/2017 |
| CN | 103875282 B | 3/2018 |
| CN | 108012287 A | 5/2018 |
| CN | 105282709 B | 9/2018 |
| CN | 108886721 A | 11/2018 |
| CN | 109155953 A | 1/2019 |
| CN | 109451846 A | 3/2019 |
| CN | 107734542 B | 1/2020 |
| CN | 110915262 A | 3/2020 |
| CN | 107113645 B | 6/2020 |
| CN | 107277761 B | 6/2020 |
| CN | 111263412 A | 6/2020 |
| CN | 111345065 A | 6/2020 |
| CN | 107211329 B | 7/2020 |
| CN | 107371198 B | 7/2020 |
| CN | 109892001 B | 7/2020 |
| CN | 111406438 A | 7/2020 |
| CN | 111757409 A | 10/2020 |
| CN | 111901831 A | 11/2020 |
| CN | 110022588 B | 12/2020 |
| CN | 111093232 B | 3/2021 |
| CN | 112449423 A | 3/2021 |
| CN | 112514435 A | 3/2021 |
| CN | 112887996 A | 6/2021 |
| CN | 112930701 A | 6/2021 |
| CN | 113170275 A | 7/2021 |
| CN | 113170365 A | 7/2021 |
| CN | 113170366 A | 7/2021 |
| CN | 113170522 A | 7/2021 |
| EP | 1643787 A2 | 4/2006 |
| EP | 2587847 A1 | 5/2013 |
| EP | 2532190 B1 | 9/2013 |
| EP | 2656660 A1 | 10/2013 |
| EP | 1776779 B1 | 1/2014 |
| EP | 2733987 A1 | 5/2014 |
| EP | 2820883 A2 | 1/2015 |
| EP | 2904832 A1 | 8/2015 |
| EP | 2922336 A1 | 9/2015 |
| EP | 2820885 B1 | 3/2016 |
| EP | 2129147 B1 | 4/2016 |
| EP | 3032877 A1 | 6/2016 |
| EP | 2883383 B1 | 4/2017 |
| EP | 3177071 A1 | 6/2017 |
| EP | 3195671 A1 | 7/2017 |
| EP | 3216256 A1 | 9/2017 |
| EP | 3232720 A1 | 10/2017 |
| EP | 3065461 B1 | 11/2017 |
| EP | 2742725 B1 | 8/2018 |
| EP | 3107330 B1 | 9/2018 |
| EP | 3091778 B1 | 11/2018 |
| EP | 2453684 B1 | 2/2019 |
| EP | 2887737 B1 | 2/2019 |
| EP | 2289264 B1 | 5/2019 |
| EP | 3506675 A1 | 7/2019 |
| EP | 3520551 A1 | 8/2019 |
| EP | 3308575 B1 | 12/2019 |
| EP | 2859738 B1 | 1/2020 |
| EP | 3625989 A1 | 3/2020 |
| EP | 3639619 A1 | 4/2020 |
| EP | 3662701 A1 | 6/2020 |
| EP | 3753295 A1 | 12/2020 |
| EP | 3152957 B1 | 1/2021 |
| EP | 3782403 A1 | 2/2021 |
| EP | 3799470 A1 | 3/2021 |
| EP | 3533207 B1 | 5/2021 |
| EP | 3178286 B1 | 7/2021 |
| JP | 5801963 B2 | 9/2015 |
| JP | 2017175655 A | 9/2017 |
| JP | 6294431 B2 | 2/2018 |
| JP | 2018110426 A | 7/2018 |
| KR | 20110067654 A | 6/2011 |
| KR | 101236357 B1 | 2/2013 |
| KR | 20130094707 A | 8/2013 |
| KR | 20140132747 A | 11/2014 |
| KR | 101966565 B1 | 4/2019 |
| KR | 102123107 B1 | 6/2020 |
| KR | 20200106702 A | 9/2020 |
| WO | 2007089128 A1 | 8/2007 |
| WO | 2009012666 A1 | 1/2009 |
| WO | 2009062440 A1 | 5/2009 |
| WO | 2010005180 A2 | 1/2010 |
| WO | 2010105567 A1 | 9/2010 |
| WO | 2010121429 A1 | 10/2010 |
| WO | 2012097707 A1 | 7/2012 |
| WO | 2013020584 A1 | 2/2013 |
| WO | 2013091665 A1 | 6/2013 |
| WO | 2013120252 A1 | 8/2013 |
| WO | 2013129994 A2 | 9/2013 |

(56) References Cited

FOREIGN PATENT DOCUMENTS

| | | |
|---|---|---|
| WO | 2013169006 A1 | 11/2013 |
| WO | 2013170484 A1 | 11/2013 |
| WO | 2013185659 A1 | 12/2013 |
| WO | 2014022970 A1 | 2/2014 |
| WO | 2014023126 A1 | 2/2014 |
| WO | 2014023221 A1 | 2/2014 |
| WO | 2014059663 A1 | 4/2014 |
| WO | 2014075227 A1 | 5/2014 |
| WO | 2014101042 A1 | 7/2014 |
| WO | 2014101054 A1 | 7/2014 |
| WO | 2014101079 A1 | 7/2014 |
| WO | 2014146261 A1 | 9/2014 |
| WO | 2014154082 A1 | 10/2014 |
| WO | 2014161450 A1 | 10/2014 |
| WO | 2014182613 A1 | 11/2014 |
| WO | 2014187389 A1 | 11/2014 |
| WO | 2014190524 A1 | 12/2014 |
| WO | 2015066875 A1 | 5/2015 |
| WO | 2015157905 A1 | 10/2015 |
| WO | 2016065580 A1 | 5/2016 |
| WO | 2016206009 A1 | 12/2016 |
| WO | 2016206214 A1 | 12/2016 |
| WO | 2017020750 A1 | 2/2017 |
| WO | 2017185923 A1 | 11/2017 |
| WO | 2018126460 A1 | 7/2018 |
| WO | 2018137427 A1 | 8/2018 |
| WO | 2018171463 A1 | 9/2018 |
| WO | 2018172136 A1 | 9/2018 |
| WO | 2018201305 A1 | 11/2018 |
| WO | 2018203739 A1 | 11/2018 |
| WO | 2020076228 A2 | 4/2020 |
| WO | 2020076230 A3 | 5/2020 |
| WO | 2020100053 A1 | 5/2020 |
| WO | 2020229552 A1 | 11/2020 |
| WO | 2021008478 A1 | 1/2021 |

\* cited by examiner

STEERING NON-MOBILE CONNECTED-MODE USER EQUIPMENT TO HIGHER CAPACITY RADIO CELLS

BACKGROUND

User equipment (UEs) in cellular communication networks, for example, in Long-term Evolution (LTE) or New Radio (NR) radio access technology (RAT) networks, make inter-frequency, intra-frequency, and inter-RAT radio measurements (e.g., measurements of reference signal received power (RSRP), reference signal received quality (RSRQ), signal to noise plus interference ratio (SINR), etc.) in two connection modes: idle (RRC_IDLE) and connected (RRC_CONNECTED) modes. In idle mode, the measurements are used for cell selection and cell re-selection; in connected mode, the measurements are used for handover and redirection scenarios for mobile UEs. UEs receive idle mode related measurement parameters via system information block (SIB) messages from an eNodeB (eNB) and a gNodeB (gNB), and connected mode related measurement parameters through radio resource control (RRC) Connection Reconfiguration messages from the eNB/gNB.

Before the handover, a UE typically takes radio measurements of the target cell and reports it to the network in measurement reports so that the network can decide whether to allow the UE to handover to the target cell. In connected mode, the UE uses a measurement gap to make inter-frequency and inter-RAT measurements (and intra-frequency measurements outside the active bandwidth part (BWP) in NR). A measurement gap is a time when no transmissions and receptions occur, allowing the UE to switch to the target cell's frequency band and RAT, take radio measurements, and return to the serving cell's frequency band and RAT to resume transmission and receptions.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the disclosed technology, a base station (e.g., an eNB or a gNB) steers wireless communication devices (e.g., user equipment (UE)) away from lower capacity (e.g., non-optimal) cells into higher capacity (e.g., optimal) cells. The disclosed technology is particularly applicable where the UEs would otherwise not make the transition to the higher capacity layers because of, for example, their stationary/non-mobile nature making it less likely that that UE will go out of coverage of the low capacity layer; absence of measurement gaps to perform inter-frequency measurements; traffic pattern of the UEs that cause the UE to operate in connected mode (RRC_CONNECTED) for long durations and infrequently transition to idle mode (RRC_IDLE) where a cell reselection to the higher capacity layer could occur based on a higher SIB priority for the higher capacity layer, etc.

When the eNB/gNB determines that a stationary (e.g., non-mobile or direct wireless), connected-mode UE has been operating on the low capacity layer (e.g., cell operating on a low bandwidth frequency band) for a certain duration, or if a higher capacity layer (e.g., cell operating on a larger bandwidth frequency band) that was previously out of service is back in service, the eNB/gNB can trigger or initiate a handover causing the UE to attach to the higher capacity layer.

The disclosed technology is particularly applicable to open radio access network (Open RAN) networks with a distributed unit (DU)/central unit (CU) split. For example, to determine that the higher capacity layer is no longer out of service, the CU can send a configuration update message to a DU of the enB/gNB requesting a status of the cells. The DU can return a configuration update acknowledge message indicating the cell status (e.g., indicating that the higher capacity cell is no longer out of service).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
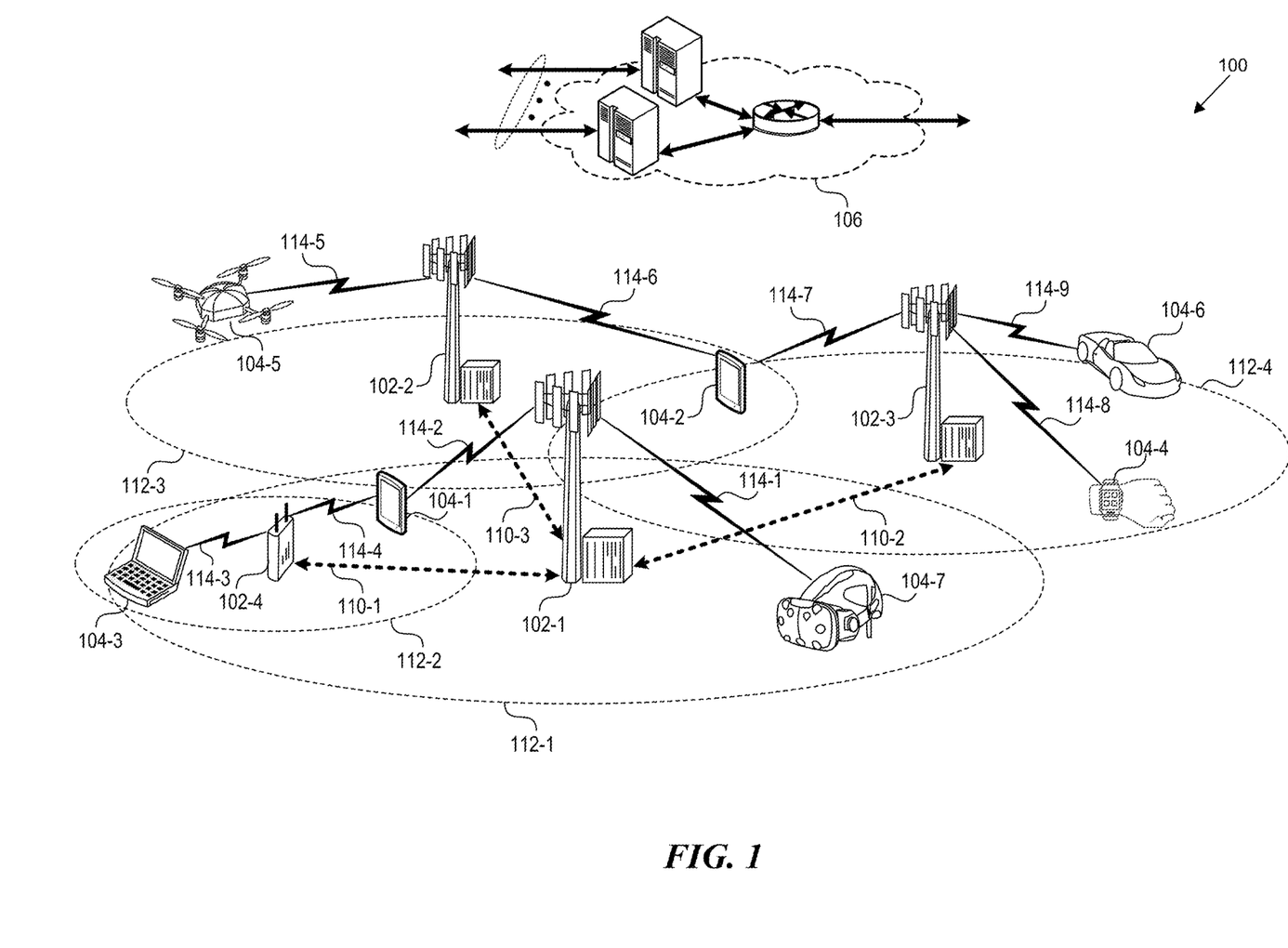
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
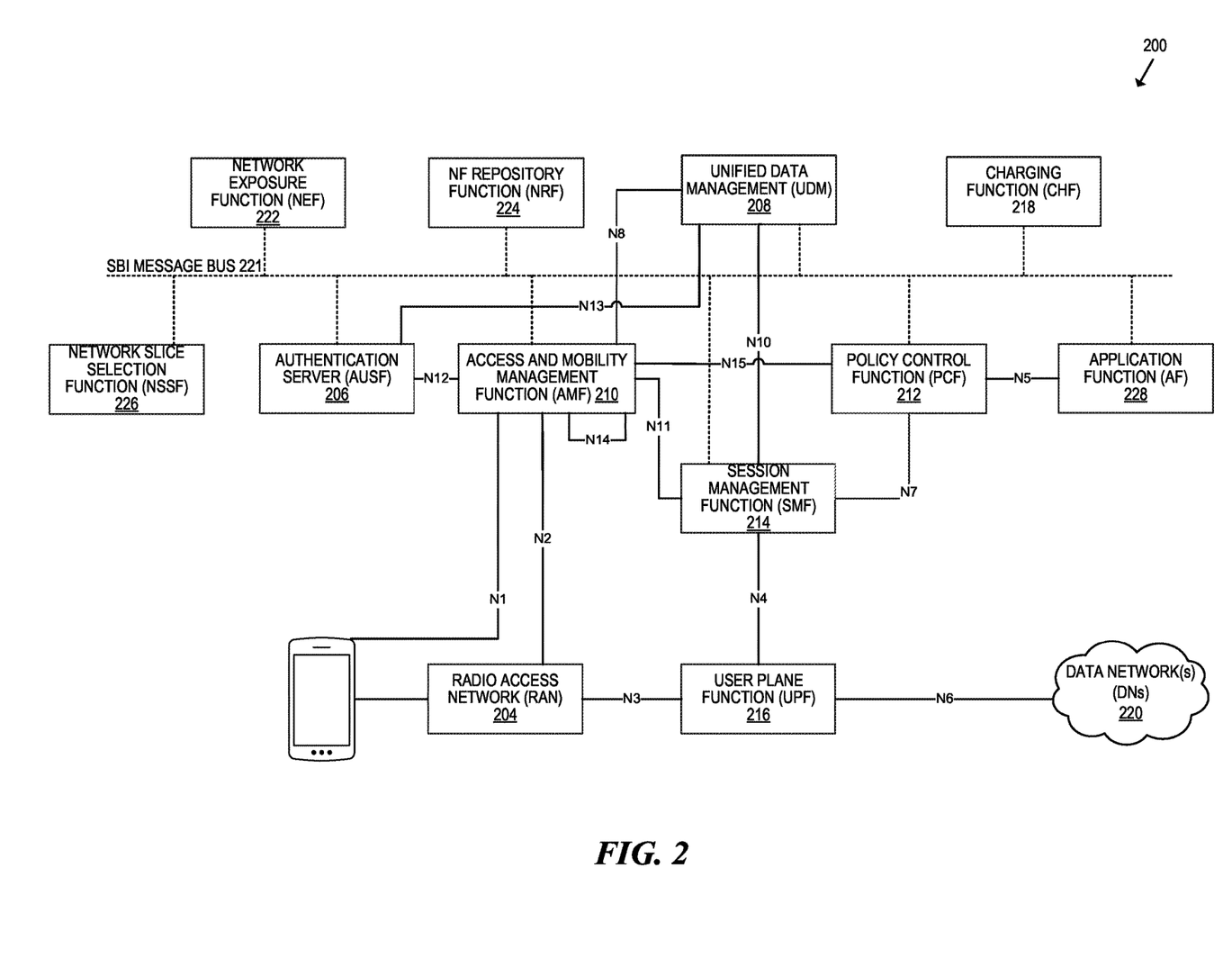
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Steering UEs to Higher Capacity Cells

Base stations, e.g., eNBs and gNBs, are generally configured with multiple cells corresponding to same frequency in multiple directions or sectors and/or multiple frequencies in same direction. When the base station is rebooted, for example for software upgrades or configuration changes, the cells go out-of-service or off-air and some of the cells might not come back in service or go on-air at the same time (varying delays in cells coming back online can be based on the cell configurations). Additionally, sometimes cell-specific configuration changes could be made resulting in temporary out-of-service status only for certain cells but not all cells served by the eNB/gNB. A UE that attaches to the eNB/gNB when some cells are temporarily offline could result in the UE getting attached to a non-optimal cell (e.g., a lower capacity cell). If the signal quality of the non-optimal cell is good (e.g., above a handover threshold), and the UE is non-mobile such that it will not travel beyond the coverage of the non-optimal cell, the UE can remain attached to the non-optimal cell for a long time (e.g., hours or days).

For example, a Home Internet 5G NR UE could attach to a lower capacity cell (e.g., a cell operating on NR band n71 at ~600 MHz) simply because a higher capacity (higher bandwidth) cell serving NR band n41 at ~2.6 GHz was temporarily offline when the UE connected to the network. Alternatively, the UE could attach to an LTE RAT because the NR RAT was temporarily offline. If the UE has an uninterrupted traffic flow (e.g., is consistently downloading or uploading data such as when backhauling live video feeds to the cloud or when the UE is shared by multiple users who are always online) it might not get a chance to transition to an idle mode (RRC_IDLE) to potentially perform a SIB-priority-based cell reselection to the higher capacity NR band n41 (when the n41 cell is back in service). Additionally or alternatively, the network operator could have disallowed inter-frequency measurements between certain bands or cells (e.g., disabled measurements of n41 when operating on n71 to prevent throughput or power hit caused by the measurement gaps). There is therefore a need for systems and methods to steer UEs away from non-optimal cells caused by cell operational state changes to allow for an improved resource utilization and an improved end user experience.

Figure 3:
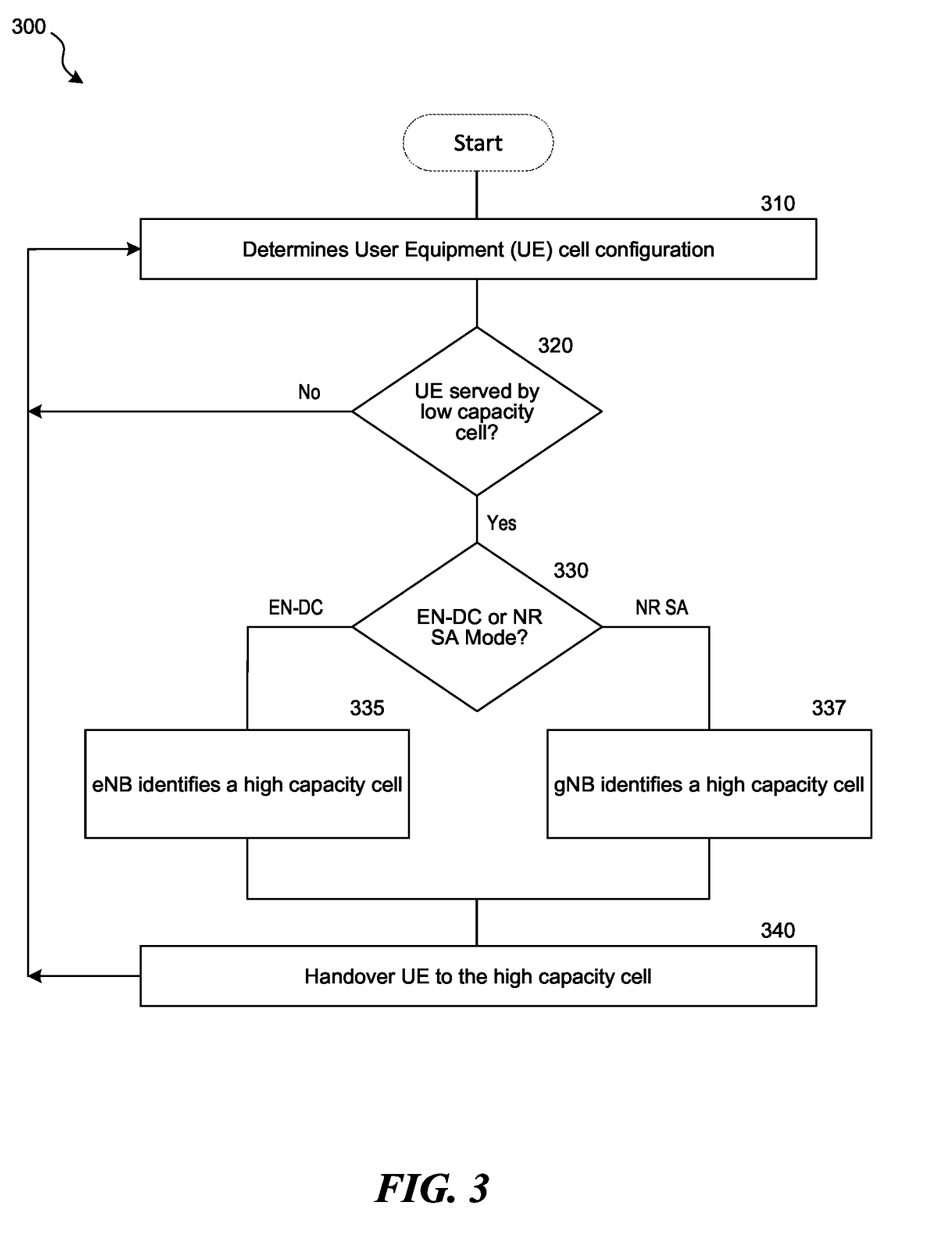
FIG. 3 is a flowchart that illustrates a process for forcing a UE to initiate handover to a higher capacity cell.

FIG. 3 is a flowchart that illustrates a process for forcing a UE to initiate handover to a higher capacity cell. At block 310 a system or network node of the cellular communication network (e.g., an eNB or a gNB) monitors or determines radio cell configurations of one or more non-mobile UEs operating in connected mode (an RRC-CONNECTED mode). For example, the eNB/gNB determines that the UE is currently being served by a serving cell operating on a first frequency band and had been served by that serving cell for a certain pre-defined configurable threshold time (e.g., for minutes, hours, days, etc.).

The configurable duration can be selected to ensure that the UE is connected to an in-service or on-air cell while other cells (e.g., more optimal cells) are out-of-service or off-air. Configuring the threshold time to a low value can cause the UE to prematurely try to connect to out-of-service cells. Examples of factors or parameters that the configurable threshold time can be based on include the number of active UEs (or the loading) on the serving non-optimal cell; the physical resource block (PRB) resource utilization on non-optimal cell; the interference levels on non-optimal cell; the traffic patterns (office/busy hours which can further depend on whether the traffic is for an indoor or outdoor application); etc.

At block 320, the eNB/gNB determines that the UE is being served by a low capacity or non-optimal radio cell. In some implementations, determining that the serving cell is a low capacity or non-optimal cell includes determining that the first frequency band has a lower bandwidth than frequency bands available on other cells that the UE can connect to or that the first frequency band has a bandwidth lower than a predefined configurable threshold bandwidth.

In some implementations, determining that the UE is being served by a low capacity or non-optimal cell includes determining that there is no mobility defined from the first frequency band to a second, higher bandwidth, frequency band (e.g., to a higher capacity or a more optimal frequency band), for example, because no measurement gaps have been configured to allow inter-frequency measurements of the second frequency band when connected to the first frequency band. Having no ability to perform inter-frequency measurements of the second frequency band can prevent connected mode handover from the serving cell operating with first frequency band to the target cell operating with the second frequency band.

In some implementations, determining that the UE is being served by a low capacity or non-optimal cell includes determining that a cell operating on a second frequency band, previously determined to be a higher capacity or more optimal frequency band, is back in service after being out of service. An example of how the eNB/gNB can determine the out-of-service status of cells is described below in relation to FIG. 4.

At block 330 the system determines whether the UE is operating in an EUTRAN/NR Dual Connectivity (EN-DC) mode or a NR standalone (SA) mode.

If the UE is operating in an NR SA mode, a gNB, at block 337, identifies a high capacity cell (e.g., optimal cell) that the UE should connect to and initiates a handover to that high capacity cell at block 340 (e.g., to a higher frequency band). The gNB sends an RRC reconfiguration message to the UE for the UE to measure the high capacity band/cell for a certain time and initiates the handover to the high capacity cell if the cell is available.

If on the other hand, the UE is operating in an EN-DC mode, an eNB, at block 335, identifies the high capacity cell that the UE should connect to and initiates a handover to that high capacity cell at block 340 (e.g., by sending an RRC reconfiguration message for the UE to measure the high capacity band/cell for a certain time).

The handover of the disclosed technology at block 340 is different from a conventional handover event because a trigger event for the UE to measure a signal quality of the target cell and initiate handover based on poor radio conditions has not occurred. That is, the handover is not triggered by conventional measurement report trigger events such as the serving cell becoming worse than a threshold, neighbor cell becoming an offset better than the serving cell or better than a threshold, etc. Instead, the handover to the higher capacity cell or layer is in response to determining that the UE has been served by the lower capacity serving cell for the threshold time or in response to determining that the target cell is back in service after being out of service.

Additionally, because the UE is in a connected mode and is non-mobile with possibly no measurement gaps configured to perform inter-frequency or inter-RAT measurements to the higher capacity cell, the UE would ordinarily not have an opportunity to handover to the higher capacity target cell (e.g., if the signal quality on the lower capacity serving cell remains above a conventional handover threshold).

Non-optimal cells can result from operator configurations. For example, the operator can configure the non-optimal cell with no mobility from that cell to other higher capacity layers (e.g., no neighbor relations defined to the higher capacity layers or more optimal cells) resulting in no measurements made by the UE to measure the other higher capacity layers and hence no measurement reports sent by the UE to the network. The network operator could opt to not configure measurement gaps for some cells and/or bands to avoid a degradation in throughput or increased power arising out of the connected-mode inter-frequency/inter-RAT measurements (e.g., no measurements for NR band n41 when operating in NR band n71 or LTE band 71). Instead, the network operator can rely on idle mode measurements and cell reselection in idle mode (e.g., the UE can camp on the higher capacity target cell in idle mode via cell reselection based on a higher SIB priority of the higher capacity/bandwidth band). The inability to handover to the higher capacity cell in connected mode becomes potentially problematic for certain UEs that do not frequently transition to idle mode because of the type of UE, for example, stationary or non-mobile UEs with high bandwidth utilization such as home internet routers with constant data traffic (e.g., constant backhaul of surveillance cameras to the cloud, connected smart home devices and other networked devices that are constantly online, etc.).

In some implementations, initiating the handover to the higher capacity cell at block 340 entails sending the UE a configuration message (e.g., an RRC Reconfiguration message) which causes the UE to measure the signal quality of the high capacity cell (signal quality of the frequency band of the high capacity target cell).

Figure 4:
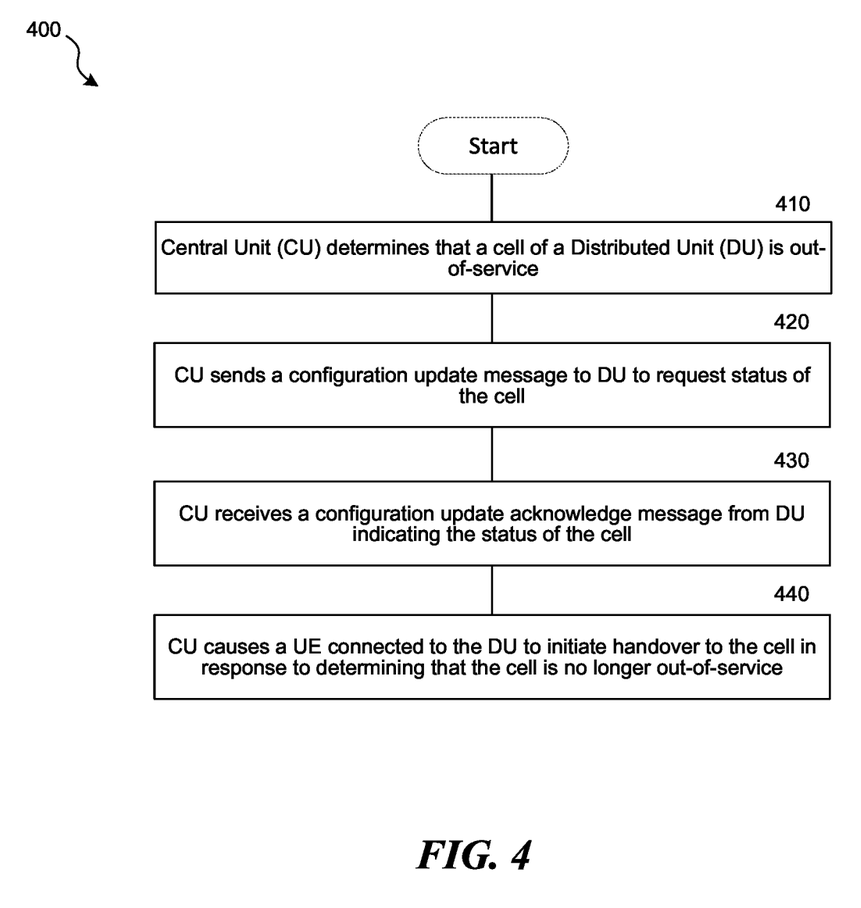
FIG. 4 is a flowchart that illustrates a process for determining that a cell is back in service.

FIG. 4 is a flowchart that illustrates a process for determining that a cell is back in service. At block 410, a central unit (CU) (for example an eNB or gNB-CU in an Open RAN network) determines that a target cell is out of service. For example, when the target cell associated with a distributed unit (DU) is going off-air or out of service (e.g., undergoing a reboot or being taken temporarily offline in a maintenance window), the DU can send a configuration update to the CU notifying it that the cell status is out-of-service.

It will be appreciated that although described in relation to Open RAN with a CU/DU split, the disclosed technology is applicable to other RAN architectures including Open Base Station Architecture Initiative (OBSAI) or similar based cloud architectures that include some split between antennas/cells and common baseband processing resources.

At block 420, the CU sends to the DU a configuration update message configured to request a status of the target cell.

At block 430, the CU receives a configuration update acknowledge message from the DU where the message is configured to indicate that the target cell is back in service.

At block 440, the CU causes a UE connected to the target cell associated with the DU to initiate a handover to the target cell in response to determining that the target cell is no longer out-of-service. Initiating the handover to the target cell can include sending a configuration message to the UE to cause the UE to perform inter-frequency or inter-RAT measurements of the target cell and to send a measurement report to the CU eNB/gNB.

In some implementations, the eNB/gNB can direct the UE to handover to the higher capacity band (e.g., the optimal band) without inter-frequency/inter-RAT measurements (e.g., blind redirection).

Figure 5:
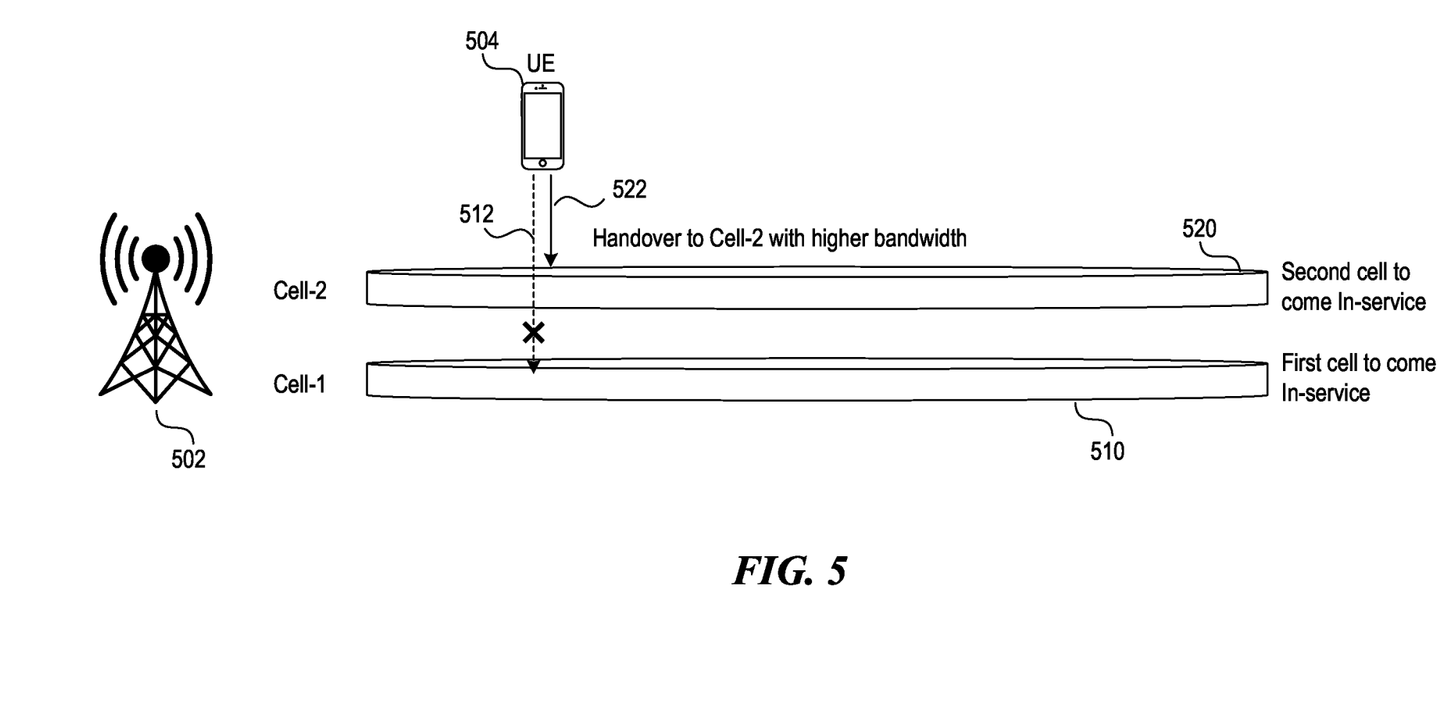
FIG. 5 is a block diagram that illustrates steering a UE from an initial low capacity cell to a higher capacity cell.

FIG. 5 is a block diagram that illustrates steering a UE 504 from an initial low capacity cell 510 (e.g., the first cell to come online from an out-of-service state) to a higher capacity cell 520 (e.g., the second cell to come online from an out-of-service state). Cell 510 and cell 520 can be associated with a single base station 502 (e.g., eNB or gNB), multiple base stations, or one or more distributed units (DUs) of eNB/gNB (e.g., in Open RAN networks).

Consider an example implementation where the base station 502 is a three sector gNB with each sector having two cells (cell-1 & cell-2) radiating with separate frequencies each (e.g., NR n71 & n41) in overlapping direction. Assuming that n71 has a lower bandwidth (e.g., 10 MHz) and n41 has a higher bandwidth (e.g., 100 MHz), n41 could provide a higher capacity to the UE (e.g., a higher data throughput).

Additionally consider that UE 504 can be a stationary or non-mobile UE operating in connected mode (UE operating in RRC_CONNECTED mode) without an ability to perform inter-frequency or inter-RAT measurements on a frequency band of cell 520 (e.g., no measurement gaps configured for cell 510 operating on n71 to measure cell 520 operating on n41) and thus unable to handover to cell 520 in a connected mode (e.g., only able to camp on cell 520 during an initial cell selection or an idle mode cell reselection).

If UE 504 is a home internet device (e.g., a home internet router) or other stationary non-mobile device such as an IoT smart home device with high bandwidth utilization (e.g., constant data traffic without frequent transitions to RRC_IDLE mode), the preferred serving cell might be NR band n41 (e.g., band n41 could have a higher SIB priority to allow the UE to more likely attach to this band during initial cell selection and reselection). If, however, the entire base station 502 is restarted, all 6 cells of the gNB (3-sectors× 2-bands) would go out-of-service and potentially come back in service at different times. If the n71 cell comes in-service before the n41 cell, the home internet device could attach to the n71 cell. Alternatively, if the home internet device is currently being served by band n41 and band n41 is temporarily taken offline (e.g., a temporary service interruption during a maintenance window or other planned outage), the home internet device could handover to band n71 because if no coverage on band n41. After the maintenance window, the home internet device would stay on band n71 instead of performing a handover back to band n41. Because the n71 cell has a lower capacity/lower bandwidth than the n41 cell, this can cause degraded performance to the users of the home internet device. Additionally, because the home internet device is stationary and has high data usage, it could be "stuck" with the n71 cell until and unless some other off-loading mechanism occurs, or the device user reboots the device (initiating an IDLE-mode cell selection).

The disclosed technology allows for the UE 504 to steer away from the low capacity cell 510 (depicted by dashed arrow 512) which was the first cell to come in-service, e.g., steer away from NR band n71, and handover to the high capacity cell 520 (depicted by solid arrow 522) which was the second cell to come in-service. After the base station 502 determines that the connected-mode UE 504 has been operating on the NR band n71 layer for a threshold time (e.g., for several minutes, hours, days, etc.) or after the base station determines that the NR band n41 layer which had been temporarily taken out of service is now back in server, the base station can initiate a handover of the UE 504 to the higher capacity n41 layer. A handover to the n41 layer can cause the UE to operate at a higher throughput (e.g., higher speed) than a throughput when the UE is operating on the n71 layer.

To initiate the handover, the base station can send an RRC reconfiguration message to the UE to cause the UE to perform radio measurements of the n41 layer (e.g., configure inter-frequency measurement gaps so that the UE can perform the inter-frequency measurements of the n41). The UE sends a measurement report to the base station so that the base station can ascertain that the signal quality of the n41 cell is good enough to use.

In some implementations, the UE would not send the measurement report to the eNB/gNB if the typical trigger events to send measurement reports are not met, e.g., no neighbor relations defined. The eNB/gNB can request the UE to perform measurements and send measurement report via dedicated RRC reconfiguration message (e.g., periodic or aperiodic RRC messages) irrespective of the serving cell's signal strength (and other typical measurement triggers).

Although the disclosed technology can be applied to any UE meeting the conditions described above (e.g., has been connected to a non-optimal or low capacity cell for a threshold time or a higher capacity cell has come back online), in some implementations, the disclosed technology can be targeted to only certain types of UEs (e.g., stationary, high utilization UEs such as home internet devices). The eNB/gNB can determine that type of UE (e.g., based on a property of the UE) from UE capability messages (e.g., the power class of the UE or other capabilities of the UE that can indicate that it is a home internet device, a stationary/non-mobile device, a high bandwidth utilization device, or otherwise a device that will not frequently transition to idle mode).

The cellular network (e.g., the core network) can also determine the type of UE and provide an indication on the UE type to the eNB/gNB. For example, the home subscriber server (HSS) can include an indication of the type of service that the UE is subscribed to (e.g., determine that the UE is subscribed to a home internet plan and hence is a home internet device) and can communicate such information to the eNB/gNB (e.g., via a subscriber profile identifier (SPID)). Additionally, the network can evaluate the location history and/or traffic pattern or profile of the UE to determine the type of UE.

In some implementations, instead of steering the UE away from lower capacity or lower bandwidth cells, the disclosed technology can steer the UE to lower capacity or lower bandwidth cells and away from higher capacity cells, for example, to improve the overall resource utilization of the cellular network. For example, consider where the UE is an IoT device (e.g., an LTE category 0/1, category M, or a category NB device (NB-IoT device)) with a high duty cycle such that the IoT device rarely goes to idle mode, but with a low throughput and enhanced coverage requirement. The disclosed technology can redirect the UE to lower capacity layers (e.g., n71/B71 or UMTS/LTE RAT) so that the higher capacity layers (e.g., n41 or NR RAT) are reserved for higher bandwidth applications (e.g., enhanced mobile broadband applications).

IoT devices, e.g., based on NB-IoT technology, commonly used as underground parking sensors, deep inside building, or in other poor signal coverage regions, operate better on a layer with good inbuilding penetration (e.g., a lower frequency band such as B71/n71 at ~600 MHz instead of a higher frequency band like B41/n41 at ~2.6 GHz). For such devices, the non-optimal cell that such IoT devices can be stuck on can be such as the high capacity (high frequency band) cell which offers lower coverage. For example, NB-IoT and Cat-M devices include Coverage Extension (CE) functionality where the devices repeat the same message or data when in poor radio conditions thereby extending coverage to hard-to-reach areas. Using CE0/1/2 adds unnecessary capacity on the network and battery drain on IoT UE. Consequently, it is often preferable for such IoT UEs to operate be on lower bands (e.g., B71/n71) and use CE0 (no-reputations) vs operate on higher bands (e.g., B41/n41) and use CE2 (high repetitions).

Computer System

Figure 6:
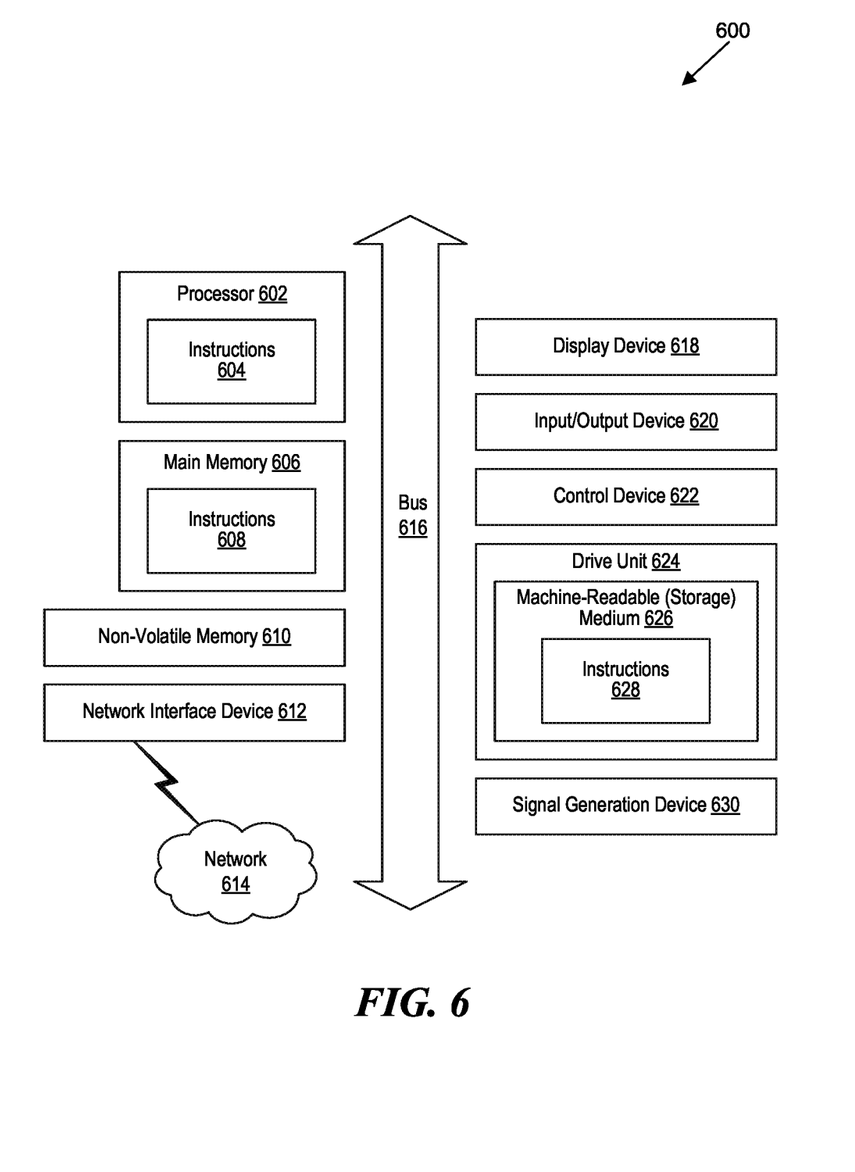
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a system, cause the system to:
   determine that a user equipment (UE) has been served by a serving cell operating on a first frequency band for a threshold time, or determine that a target cell operating on a second frequency band is back in service after being out of service, wherein the UE is in a connected mode and is not mobile or is a fixed wireless UE device,
wherein a trigger event for the UE to measure a signal quality of the second frequency band of the target cell has not occurred, and
wherein the first frequency band comprises a smaller bandwidth than a bandwidth of the second frequency band; and
in response to determining that the UE has been served by the serving cell for the threshold time or determining that the target cell is back in service, initiate a handover to the second frequency band of the target cell,
wherein initiating the handover comprises sending the UE a configuration message to cause the UE to measure the signal quality of the second frequency band of the target cell.

2. The at least one computer-readable storage medium of claim 1, wherein the determining that the target cell operating on the second frequency band is back in service after being out of service comprises:
determining, by a central unit (CU) of an eNB or a gNB, that the target cell is out of service;
sending, by the CU, a configuration update message to a distributed unit (DU) of the eNB or gNB,
wherein the configuration update message is configured to request a status of the target cell;
receiving, by the CU, a configuration update acknowledge message from the DU,
wherein the configuration update acknowledge message is configured to indicate that the target cell is back in service.

3. The at least one computer-readable storage medium of claim 1, wherein initiating the handover to the second frequency band of the target cell thereby causes the UE to operate at a higher throughput than a throughput when the UE is served by the serving cell operating on the first frequency band.

4. The at least one computer-readable storage medium of claim 1, wherein the system comprises an eNB configured to identify the second frequency band of the target cell when UE is configured in a E-UTRAN-NR Dual Connectivity (ENDC) mode, or a gNB configured to identify the second frequency band of the target cell when the UE is configured in an NR standalone mode.

5. The at least one computer-readable storage medium of claim 1, wherein the first frequency band comprises a New Radio (NR) band n71 and the second frequency band comprises an NR band n41.

6. The at least one computer-readable storage medium of claim 1, wherein the UE comprises a home internet router or an Internet of Things (IoT) device configured for a non-mobile application.

7. A method for use in fixed wireless applications, the method comprising:
determining that a connected-mode user equipment (UE) has been operating on a first layer of a serving cell for a threshold time, or determining that a second layer of a target cell is no longer out of service,
wherein the second layer provides a higher capacity to the UE than the first layer, and
wherein the UE is a fixed wireless UE device; and
in response to determining that the UE has been operating on the first layer for the threshold time, or determining that the target cell is no longer out of service, initiating a handover to the second layer of the target cell,
wherein initiating the handover comprises sending the UE a configuration message to cause the UE to perform a radio measurement of the target cell.

8. The method of claim 7,
wherein the first layer comprises a first frequency band or a first radio access technology (RAT), and the second layer comprises a second frequency band or second RAT, and
wherein the first frequency band comprises a smaller bandwidth than a bandwidth of the second frequency band.

9. The method of claim 7, wherein the determining that the second layer of the target cell is no longer out of service comprises:
determining, by a central unit (CU) of an eNB or a gNB, that the target cell is out of service;
sending, by the CU, a configuration update message to a distributed unit (DU) of the eNB or gNB,
wherein the configuration update message is configured to request a status of the target cell;
receiving, by the CU, a configuration update acknowledge message from the DU,
wherein the configuration update acknowledge message is configured to indicate that the target cell is no longer out of service.

10. The method of claim 7, wherein the initiating the handover to the second layer of the target cell thereby causes the UE to operate at a higher throughput than a throughput when the UE is operating on the first layer of the serving cell.

11. The method of claim 7, further comprising:
prior to determining that the connected-mode UE has been operating on the first layer of the serving cell for the threshold time or determining that the second layer of the target cell is no longer out of service, determining a property of the UE from a capability message from the UE or from a subscriber profile identity,
wherein the property of the UE identifies the UE as a stationary device or a high bandwidth utilization device.

12. The method of claim 7, wherein the first layer comprises a New Radio (NR) band n71 and the second layer comprises an NR band n41.

13. The method of claim 7, wherein the UE comprises a home internet router or an Internet of Things (IoT) device configured for a non-mobile application.

14. A base station comprising:
at least one hardware processor; and
at least one non-transitory memory, coupled to the at least one hardware processor and storing instructions, which, when executed by the at least one hardware processor, cause the base station to:
determine that a connected-mode user equipment (UE) has been operating on a first layer of a serving cell for a threshold time or determine that a second layer of a target cell is back in service,
wherein the second layer provides a higher capacity to the UE than the first layer; and
in response to determining that the UE has been operating on the first layer for the threshold time or determining that the target cell is back in service, initiate a handover to the second layer of the target cell.

15. The base station of claim 14,
wherein the first layer comprises a first frequency band or a first radio access technology (RAT), and the second layer comprises a second frequency band or second RAT, and
wherein the first frequency band comprises a smaller bandwidth than a bandwidth of the second frequency band.

16. The base station of claim 14, wherein the initiating the handover comprises sending the UE a radio resource control (RRC) reconfiguration message to cause the UE to perform an inter-frequency or an inter-RAT radio measurement of the target cell.

17. The base station of claim 14, wherein the initiating the handover to the second layer of the target cell thereby causes the UE to operate at a higher throughput than a throughput when the UE is operating on the first layer of the serving cell.

18. The base station of claim 14, wherein the base station is further caused to:
prior to determining that the connected-mode UE has been operating on the first layer of the serving cell for the threshold time or determining that the second layer of the target cell is back in service, determining a property of the UE from a capability message from the UE or from a subscriber profile identity,
wherein the property of the UE identifies the UE as a stationary device or a high bandwidth utilization device.

19. The base station of claim 14, wherein the first layer comprises a New Radio (NR) band n71 and the second layer comprises an NR band n41.

20. The base station of claim 14, wherein the UE comprises a stationary device or a high bandwidth utilization device.

* * * * *